United States Patent [19]
Martinez et al.

[11] Patent Number: 5,953,523
[45] Date of Patent: *Sep. 14, 1999

[54] METHOD AND APPARATUS FOR CREATING "SMART FORMS"

[75] Inventors: Sarka J. Martinez, Austin; Brigitte Anschuetz, Spicewood; Anthony E. Martinez, Austin, all of Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/736,845

[22] Filed: Oct. 28, 1996

[51] Int. Cl.$^6$ .................................................. G06F 9/44
[52] U.S. Cl. ......................... 395/701; 345/356; 395/683
[58] Field of Search ................................ 395/680–685, 395/701; 345/356

[56] References Cited

U.S. PATENT DOCUMENTS

| | | | |
|---|---|---|---|
| 4,558,413 | 12/1985 | Schmidt | 707/203 |
| 4,623,963 | 11/1986 | Phillips | 395/712 |
| 4,649,513 | 3/1987 | Martin et al. | 707/526 |
| 4,813,013 | 3/1989 | Dunn | 345/333 |
| 4,870,611 | 9/1989 | Martin et al. | 707/526 |
| 5,025,398 | 6/1991 | Nelson | 395/112 |
| 5,086,393 | 2/1992 | Kerr et al. | 702/186 |
| 5,091,868 | 2/1992 | Pickens et al. | 707/506 |
| 5,113,041 | 5/1992 | Blonder | 345/173 |
| 5,208,906 | 5/1993 | Morgan | 707/520 |
| 5,222,211 | 6/1993 | Mueller et al. | 707/506 |
| 5,704,029 | 12/1997 | Wright | 707/505 |
| 5,727,175 | 3/1998 | Malone et al. | 345/356 |
| 5,732,270 | 3/1998 | Foody et al. | 395/683 |

OTHER PUBLICATIONS

D.G. Bobbrow, "The object of desire," Datamation, vol. 35(9), p. 37(3), May 1989.

J.A. Konstan and L.A. Rowe, "Developing a GUIDE Using Object–Oriented Programming," Proc. on Object–Oriented Programming Systems, Languages, and Applications, pp. 75–88, Nov. 1991.

J. Herczeg, et al., "Progress in Building User Interface Toolkits: The World Accroding to XIT," Proc. 5th Annual ACM Symp. on User Interface Software and Technology, pp. 181–190., Nov. 1992.

David D. Busch PC/MS DOS 4.0 for Hard Disk Users Bantam Books 1989 ISBN 0–553–34600–8 pp. 274–277; 294–295.

*Primary Examiner*—Robert W. Downs
*Attorney, Agent, or Firm*—Jeffrey S. LaBaw; Daniel E. Venglarik; Andrew J. Dillon

[57] ABSTRACT

An architecture is provided for user applications in a computer system including a core application executable by the system and having a data entry space. A field overlay executable by the system, although not necessarily independently executable, stacks functions on top of the core application and imposes a structure on the data entry space to become an extension of the core application, thus creating additional user applications driven by task needs. If implemented in an object-oriented manner, the field overlay inherits attributes of the core application. Links and macros within the field overlays may improve the effectiveness of the core application in accomplishing the desired task.

20 Claims, 4 Drawing Sheets

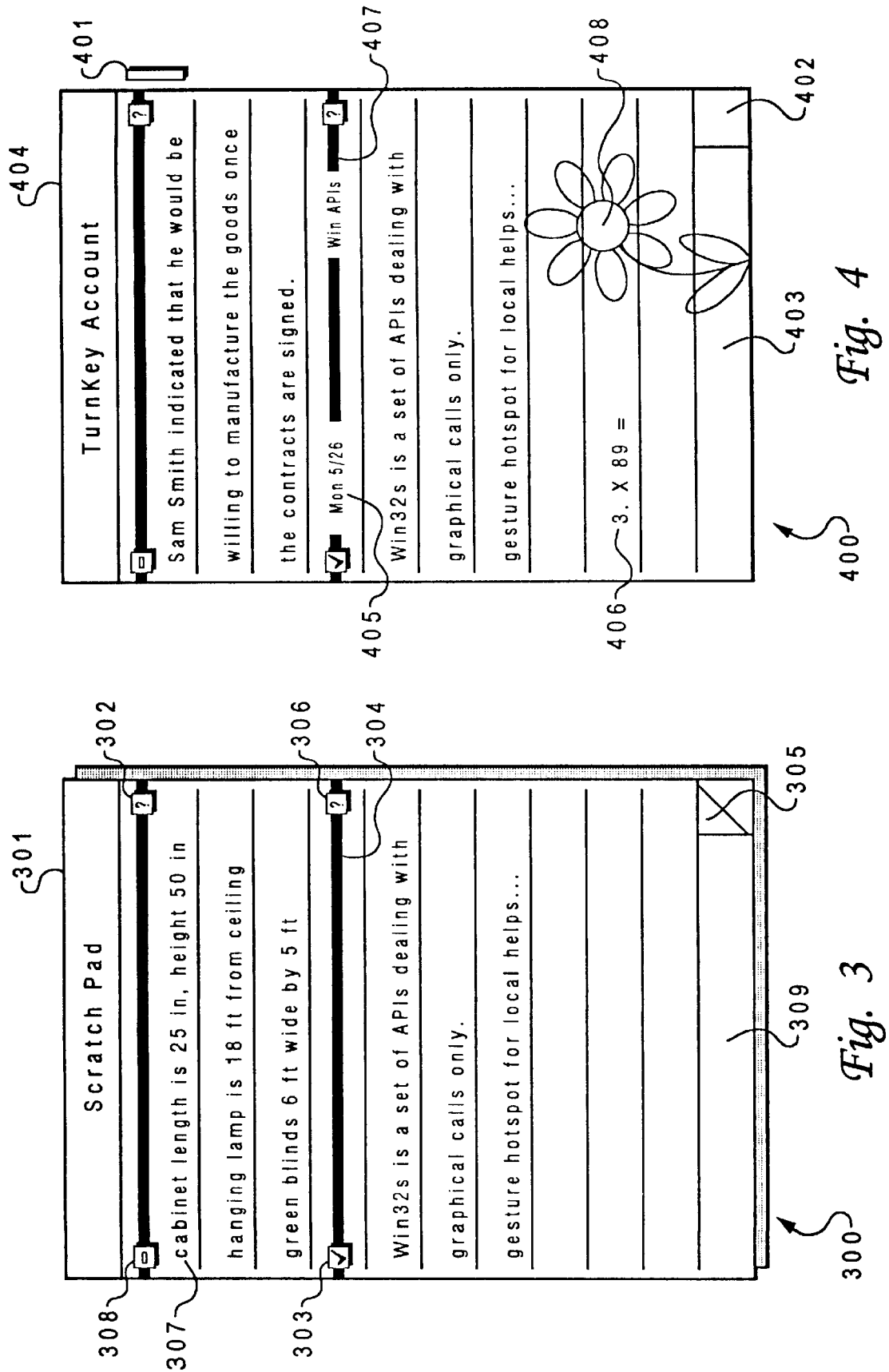

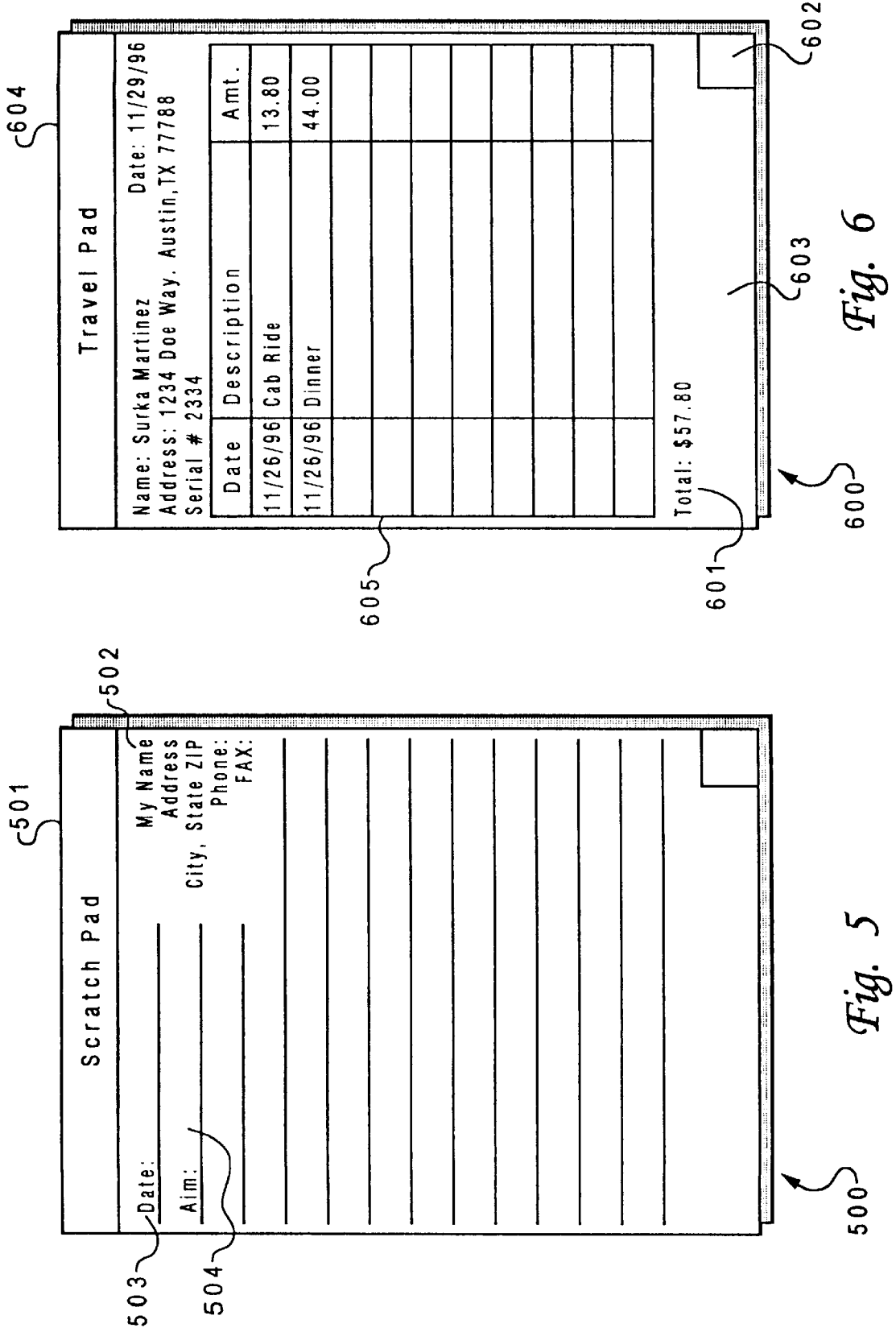

METHOD AND APPARATUS FOR CREATING "SMART FORMS"

BACKGROUND OF THE INVENTION

1. Technical Field

The present invention relates in general to an architecture for user applications which reduces the amount of storage space occupied by the applications by stacking functions, and in particular to an architecture for user applications in which necessary subtasks may be integrated for the purpose of accomplishing a single task. Still more particularly, the present invention relates to executable user applications implemented as field overlays which inherit the functionality and attributes of the generic or core application.

2. Description of the Related Art

A typical general purpose digital computer contains many different user applications, each requiring user entry and each occupying storage space. Such utilization of independent applications may strain system resources, particularly in environments with very little storage capacity. Independent applications also may require users to switch between different applications, such as a word processor or a spreadsheet, to accomplish a single task.

An architecture which allows complete integration of various functions necessary to accomplish a single task would relieve the user from the necessity of switching between applications. Sharing of core functions by various applications would reduce the amount of storage space occupied by the user applications, and would also shorten application development periods since developers may simply create advanced "forms" for the core application rather than develop new applications from scratch.

Some existing architectures, such as OLE and OpenDoc, allow partial integration of functions between different applications. These architectures, however, still require separate core applications, with one application being accessed as needed from within a different application. These architectures also require a substantial amount of memory and storage space to support and are unsuitable for small systems.

Other architectures allow the creation of forms or applications having common objects. Typically an object dictionary is utilized to validate the elements in a new form or allow addition of a new object into new or existing forms, allowing creations of new forms or applications without recompiling existing forms or applications in the system. However, these applications have no core application, and are merely a common set of objects used by different applications.

The HyperText Markup Language (HTML) used by World Wide Web browsers is an architecture which may be viewed as allowing a core application (the browser) to present different "forms" or user interfaces. However HTML is a simple tag language with limited capacity both for imposing specific structure (such as visual layout) on the user interface and for allowing definition of various user input fields. HTML also does not integrate functions into a single application, but is essentially limited to showing text and graphics. Executable functions which may be called by a Web browser, such as JAVA programs or CGI (Common Gateway Interface) scripts, are separate entities from the HTML file. HTML files themselves are not executable and therefore lack the full functionality of coding. Moreover, HTML as typically used requires a communications link.

In small systems with limited storage capacity, such as a Personal Digital Assistant (PDA) or Personal Communications Assistant (PCA), it would be desirable to provide a simple architecture for robust, integrated user applications requiring less memory and space to support than OLE or OpenDoc.

SUMMARY OF THE INVENTION

It is therefore one object of the present invention to provide an architecture or paradigm for user applications which reduces the amount of storage space occupied by the applications by stacking functions.

It is another object of the present invention to provide an architecture or paradigm for user applications in which necessary subtasks may be integrated for the purpose of accomplishing a single task.

It is yet another object of the present invention to provide an architecture which allows quick development of robust applications for a variety of purposes by implementing executable user applications as field overlays which inherit the functionality and attributes of the generic or core application.

The foregoing objects are achieved as is now described. An architecture is provided for user applications in a computer system including a core application executable by the system and having a data entry space. A field overlay executable by the system, although not necessarily independently executable, stacks functions on top of the core application and imposes a structure on the data entry space to become an extension of the core application, thus creating additional user applications driven by task needs. If implemented in an object-oriented manner, the field overlay inherits attributes of the core application. Links and macros within the field overlays may improve the effectiveness of the core application in accomplishing the desired task.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is the user interface of a core application in accordance with a preferred embodiment of the present invention.

FIG. 4 illustrates the user interface of a core application with a field overlay loaded but invisible to the user in accordance with a preferred embodiment of the present invention.

FIG. 5 is the user interface of a core application with a field overlay loaded in accordance with a preferred embodiment of the present invention.

FIG. 6 illustrates the user interface of a core application with another field overlay loaded in accordance with a preferred embodiment of the present invention.

DETAILED DESCRIPTION OF THE PREFERRED EMBODIMENT

The difficulties described above may be solved by the utilization of field overlays in conjunction with a core or generic application to create different user applications driven by task needs. The core application may function independently of the field overlays, but the field overlays function only as extensions of the core application.

Figure 1:
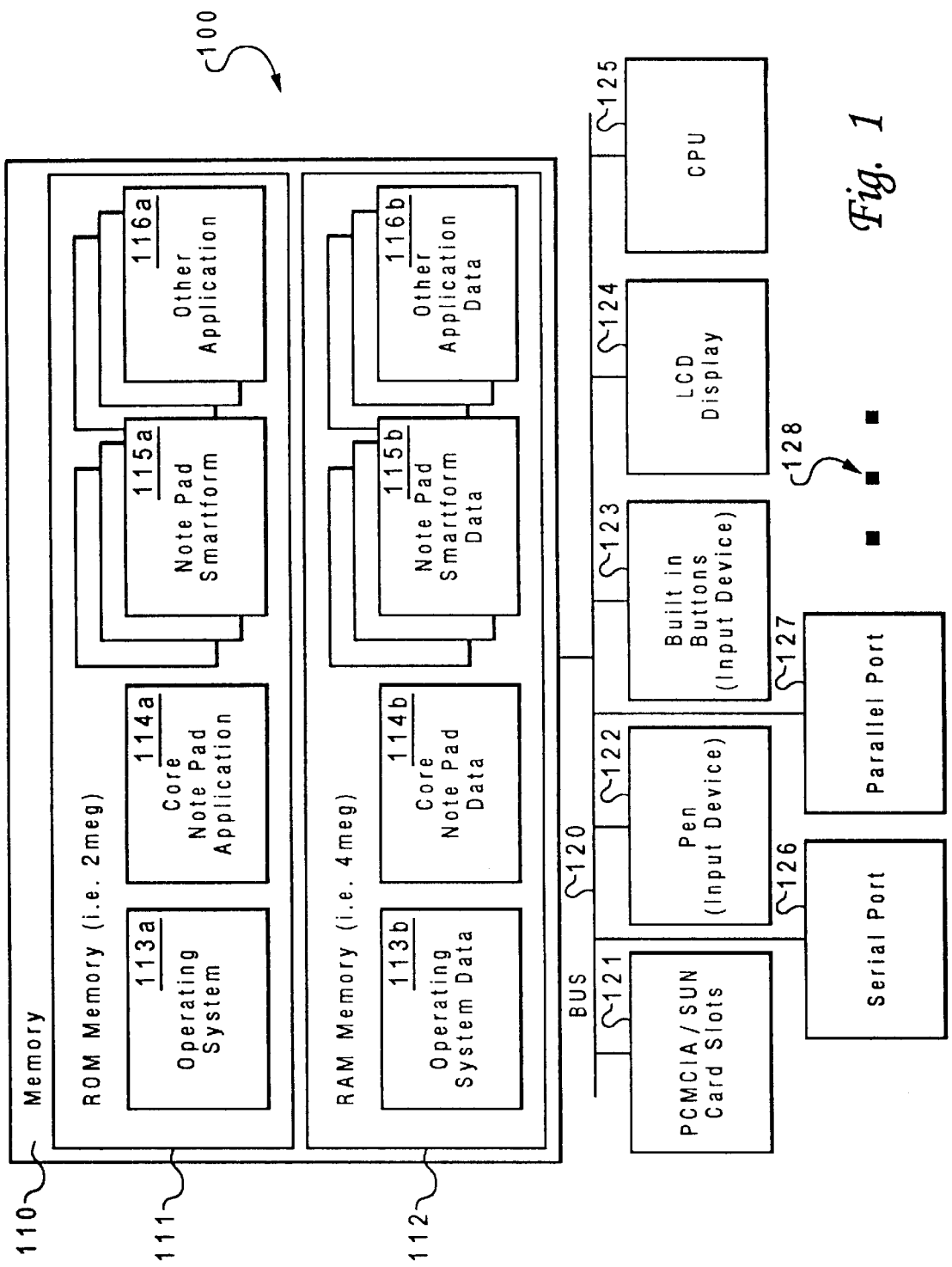
FIG. 1 depicts a block diagram of the hardware in which a preferred embodiment of the present invention may be implemented.

With reference now to the figures, and in particular with reference to FIG. 1, there is depicted an illustration of the hardware of a PDA or PCA in which field overlays may be used with a core application in accordance with a preferred embodiment of the present invention. The hardware 100 includes a bus 120 connecting CPU 125, display 124, and input devices such as pen 122 or buttons 123. Bus 120 of the PDA/PCA may be attached to card slots 121 for connecting peripheral devices, serial ports 126 and/or parallel ports 127, and any other suitable hardware 128. Bus 120 is also connected to memory 110, which may include read-only memory (ROM) 111 and random access memory (RAM) 112. As illustrated, software components may be divided between ROM 111 and RAM 112, for example by separating operating system 113a from operating system data 113b, core application such as "Note Pad" 114a from core application data 114b, field overlays such as "Note Pad Smartform" 115a from field overlay data 115b, and other applications 116a from other application data 116b. It will be understood by those of ordinary skill that the arrangement shown is merely illustrative of one possible configuration. Many other configurations may be acceptable, including storage of both software components and their corresponding data in the same memory.

Figure 2:
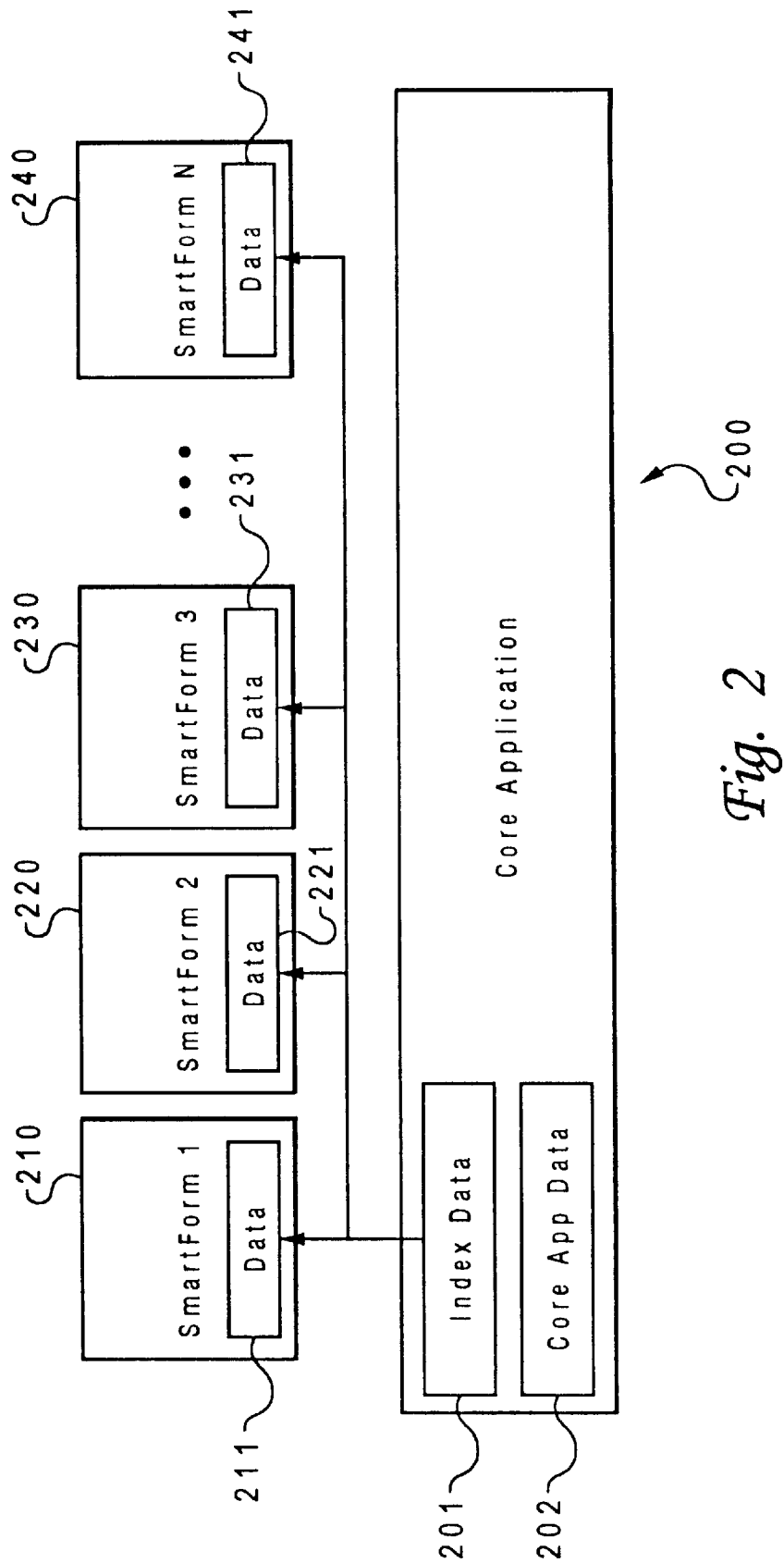
FIG. 2 is a block diagram illustrating components of a core application and field overlays in accordance with a preferred embodiment of the present invention.

Referring to FIG. 2, an architecture for implementing a preferred embodiment of the present invention is depicted. The architecture includes a core application 200 and n field overlays 210, 220, 230, and 240. The generic or core application 200 may be a notepad, a simple program for entering, storing, or transmitting information. The notepad may function independently of any field overlays by allowing the user to enter information freehand, for example.

Field overlays ("SmartForms") 210, 220, 230, and 240 are provided for use with the notepad to extend the notepad's functionality and assist the user in writing a letter, note, or memo, recording travel expenses, or balancing an account using a calculator or spreadsheet. Thus, while the notepad does not impose any structure on the data entry space, a field overlay attaches specific structure driven by task needs. The field overlays may be implemented in an object oriented manner by treating them as a "mixin" over the generic application. "Mixin" is a standard object-oriented programming term referring to a class of objects which cannot stand alone, but must be combined with another class, where it adds extra functionality.

Field overlays 210, 220, 230, and 240 snap into core application 200, inheriting attributes from and extending the functionality of core application 200. The attributes or functionality which the notepad and the field overlay share may include:

1. a page index and/or page selection;
2. handwriting, shape, or "gesture" recognition ("gestures" are actions in the user interface interpreted as commands, such as standard editing notations used to capitalize characters, strike words, etc.);
3. the "presentation manager," or the drawing plane and ink rendering functions which create the graphical user interface; and
4. the ability to store information.

The field overlay would also probably inherit certain attributes of the notepad, which might include ink styles, page backgrounds, numbering schemes, and particular user interface characteristics such as a title area.

Each field overlay 210, 220, 230, and 240 has an individual data area 211, 221, 231, and 241. Data area 241 corresponding to a particular field overlay 240 is maintained by that field overlay 240.

Core application includes an index 201 to the field overlays loaded. As new field overlays are installed, they are registered with the core application and an corresponding index entry is created. Index 201 may aid in retrieving data from a specific field overlay 210 by providing a pointer to data area 211 within that field overlay. Because core application 200 may be used alone, without any field overlay, core application 200 has its own data area 202.

With reference now to FIG. 3, the user interface of a core "Note Pad" application in accordance with a preferred embodiment of the present invention is illustrated. A core application may provide a simple, unstructured data entry space 300. Functionally, however, the core application may include any number of features and graphical representations of such features. A binder 301 such as that found at the top of physical notepads may be used. Shadow 302, having a functional role described below, may also be displayed. Page-turning may be represented by the graphical device of a bent corner 305, turning pages when the corner is tapped by a user utilizing a pointing device such as a pen. Character recognition converts cursive or printed characters into typed characters 307. Gesture recognition converts a double line gesture into creation of a new note section, represented by a separator bar 304. Dragging separator bar 304 downward will cause extra space to be added to the above note section. All items below that bar on the page will be pushed down and data within subsequent note section wrapped to the next page if necessary. Separator bars may be removed by a "z" gesture on the bar.

Tapping on a blank box 308 in the upper left of a note section marks the section, represented by a checkmark in the box as depicted at reference character 303. Tapping the box again will unmark the note section. Actions, such as font changes, may be applied to all marked note sections. Tapping on question mark box 306 in the upper right of a note section displays the note section's description, which defaults to "untitled."

Referring to FIG. 4, an alternative user interface for the core "Note Pad" application with a field overlay extending the core application in accordance with a preferred embodiment of the present invention is depicted. The core application may have more than one data entry space independent of the field overlays. For example, double tapping on page number 403 turns on the vertical scroll function. The page turning graphic (bent corner 305) is eliminated 402 and replaced with vertical scroll bar 401. Shadow 302 is removed when the scroll bar is present, reinforcing the presence of a different page metaphor to the user. When the scroll function is turned on, the page size is dynamically expanded to accommodate additional data. Data is not wrapped to the next page as it is when the scroll function is turned off.

Field overlays which do not impose specific structure on the data entry space of the core application may be created and loaded. Such field overlays may be invisible to the user or may be represented by any type of user interface control or graphic. The presence of such a field overlay may be indicated to the user only, for example, by changing binding label 404. The field overlay may simply add features to the core application, such as a date 405 in separator bar 407 indicating when the note section was last modified.

Field overlays may be actuated or selected by any type of user interface control or graphic. Such field overlays may impose specific structure on the data entry space of the core application, but only after being selected by an action or gesture not apparent from the user interface of the core application. Thus, for example, a field overlay may be a memo form activated only when the user enters "TO:" in the data entry space of the notepad.

In still another alternative, field overlays may simply add invisible functionality to the core application, such as an "applet" or small application. For example, basic mathematical equations 406 comprised of recognized text may be calculated by a seamlessly implemented mathematical calculator. An equal sign ("=") may be used to cause the applet to begin parsing the equation in order to obtain, and automatically provide, a solution to the equation.

With reference now to FIG. 5, a user interface for the core "Note Pad" application extending by a field overlay "form" 500 in accordance with a preferred embodiment of the present invention is illustrated. While the generic application need not impose structure on the data entry space, field overlays may be used to provide a specific structural layout, data fields, or logic to the data entry space. Field overlay 500 may impose a specific, task-driven structure on the data entry space of the core application. As illustrated, binding label 501 need not necessarily be changed by the field overlay. Links 502 and 503 may be provided to pull in prestored data, automatically filling in items such as the current date, or automatically supplying a name and address/telephone information to the field overlay depending on who is logged on to the PDA/PCA. Boxes around data entry fields 504 may dynamically expand to accommodate the data entered, pushing down the structure below.

Field overlays may also override structure imposed on the data entry space of the core application by the core application. For example, the user interface of a core application with a field overlay loaded may not display separator bars as would the user interface of the core application alone.

Links within the field overlays may improve the effectiveness of the core application in accomplishing the desired task. Links may be provided within the data entry fields of the field overlay. For example, an "Attn:" field may contain links to an address book, so that once a name is supplied by the user and recognized, the address is automatically supplied. Multiple matches with the name recognized will cause a popup list to appear.

Referring to FIG. 6, the user interface of the core "Note Pad" application extended by a different field overlay "form" 600 in accordance with a preferred embodiment of the present invention is depicted. Field overlay 600 may provide as much structure to the data entry space as desired or necessary. Nonetheless inheritance of attributes such as page numbering 603, functions such as the page turning graphic 602, and visual cues such as shadow 604 may insure that a basic structure of the core application is maintained.

Macros may be also incorporated in a field overlay to increase functionality and efficiency. For example, total 601 in an expense report may be dynamically calculated from last column 605. Any other program behavior conventionally performed by macros may also be incorporated into the field overlay.

Data may be dynamically shared between field overlays. For example, the total from an expense report field overlay may be automatically supplied to cover letter field overlay or an invoice filed overlay, used to submit the expense report as part of a request for payment.

While the invention has been particularly shown and described with reference to a preferred embodiment, it will be understood by those skilled in the art that various changes in form and detail may be made therein without departing from the spirit and scope of the invention.

We claim:

1. A method of providing a variable user application in a data processing system, comprising:

providing a core application having at least one attribute and an associated core application data area for data entered into a user interface data entry space for the core application without utilizing any field overlay; and extending the core application by a field overlay inheriting the at least one attribute from the core application and integrally adding at least one additional characteristic relating to the attribute to the user interface data entry space, wherein the field overlay has an associated field overlay data area separate from the core application data area for data entered into the user interface data entry space utilizing the field overlay.

2. The method of claim 1 wherein the at least one additional characteristic comprises functionality.

3. The method of claim 1 wherein the core application comprises a data entry space and the at least one additional characteristic comprises specific structure imposed on the data entry space of the core application.

4. The method of claim 1 wherein the field overlay inherits the plurality of attributes of the core application.

5. The method of claim 1 wherein the data entry space of the core application comprises at least one feature and the field overlay overrides the at least one feature.

6. The method of claim 1 wherein the step of extending the core application further comprises providing links within the field overlay.

7. The method of claim 1 wherein the step of extending the core application further comprises providing macros within the field overlay.

8. A data processing system having a variable user application, comprising:

a core application having at least one attribute and an associated core application data area for data entered into a user interface data entry space for the core application without utilizing any field overlay; and a field overlay extending the core application, inheriting the at least one attribute from the core application and integrally adding at least one additional characteristic relating to the attribute to the user interface data entry space, wherein the field overlay has an associated field overlay data area separate from the core application data area for data entered into the user interface data entry space utilizing the field overlay.

9. The data processing system of claim 8 wherein the at least one additional characteristic comprises functionality.

10. The data processing system of claim 8 wherein the core application further comprises a data entry space and the at least one additional characteristic comprises specific structure imposed on the data entry space of the core application.

11. The data processing system of claim 8 wherein the field overlay inherits the at least one attribute of the core application.

12. The data processing system of claim 8 wherein the data entry space of the core application comprises at least one feature and the field overlay overrides the at least one feature.

13. The data processing system of claim 8 wherein the field overlay further comprises links within the field overlay.

14. The data processing system of claim 8 wherein the field overlay further comprises macros within the field overlay.

15. A user application architecture in a data processing system having a memory, comprising:

a core application executable by the data processing system and loaded in the memory, the core application having at least one attribute, a data entry space within a user interface, and an associated core application data area for data entered within the user interface data entry space without utilizing any field overlay; and a field overlay executable by the data processing system and loaded in the memory, the field overlay inheriting the at least one attribute from the core application and acting as an extension of the core application, adding at least one additional characteristic relating to the attribute to the data entry space of the core application, the field overlay having an associated field overlay data area separate from the core application data area for data entered into the user interface data entry space utilizing the field overlay.

16. The architecture of claim 15 wherein the field overlay imposes a structure on the data entry space of the core application.

17. The architecture of claim 15 wherein the field overlay inherits a plurality of attributes of the core application.

18. The architecture of claim 15 wherein the field overlay adds at least one function to the core application.

19. The architecture of claim 15 wherein the field overlay further comprises links.

20. The architecture of claim 15 wherein the field overlay further comprises macros.

* * * * *